United States Patent
Li et al.

(10) Patent No.: US 12,478,955 B2
(45) Date of Patent: Nov. 25, 2025

(54) COPPER-MAGNESIUM CO-DOPED CARBONIZED WOOD SPONGE MATERIAL, PREPARATION THEREFOR, AND APPLICATION THEREOF, AND METHOD FOR CONVERTING PLASTICS INTO FUEL BASED ON FENTON-LIKE SYSTEM

(71) Applicant: Tianjin University, Tianjin (CN)

(72) Inventors: Ning Li, Tianjin (CN); Jingya Ye, Tianjin (CN); Guanyi Chen, Tianjin (CN); Chengzhan Jun, Tianjin (CN); Beibei Yan, Tianjin (CN); Xiaoqiang Cui, Tianjin (CN); Fawei Lin, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/751,681

(22) Filed: Jun. 24, 2024

(65) Prior Publication Data

US 2025/0033031 A1    Jan. 30, 2025

(30) Foreign Application Priority Data

Jul. 28, 2023   (CN) .......................... 202310946155.3

(51) Int. Cl.
  *B01J 23/00*   (2006.01)
  *B01J 21/18*   (2006.01)
  (Continued)

(52) U.S. Cl.
  CPC .............. *B01J 23/78* (2013.01); *B01J 21/18* (2013.01); *B01J 35/56* (2024.01); *B01J 37/0203* (2013.01);
  (Continued)

(58) Field of Classification Search
  CPC ... B01J 23/78; B01J 21/18; B01J 35/56; B01J 37/0203; B01J 37/0205; B01J 37/0219;
  (Continued)

(56) References Cited

U.S. PATENT DOCUMENTS

2019/0177620 A1*  6/2019  Posmyk ................. B01D 3/225

OTHER PUBLICATIONS

Labconco Corporation, A Guide to Freeze Drying for the Laboratory, Labconco, Industry Service Publication, pp. 1-11, 2004.

* cited by examiner

*Primary Examiner* — Taiwo Oladapo
(74) *Attorney, Agent, or Firm* — Bayramoglu Law Offices LLC

(57) ABSTRACT

The present disclosure provides a copper-magnesium co-doped carbonized wood sponge material, a preparation therefor, and an application thereof, and a method for converting plastics into fuel based on a Fenton-like system. In the present disclosure, a copper-magnesium co-doped carbonized wood sponge catalyst is prepared by high-temperature pyrolysis after a wood raw material is coated with polydopamine (PDA) and a copper element and a magnesium element are loaded on a wood sponge substrate, realizing the loading of a nanoreactor on a wood sponge layered structure, and forming a unique spatial microenvironment and synergistic effect by combining a superior three-dimensional lamellar structure of the wood sponge substrate with the structural advantages of the nanoreactor to promote an electron transfer pathway on a surface.

7 Claims, 5 Drawing Sheets

(51) Int. Cl.
    *B01J 23/78*     (2006.01)
    *B01J 35/56*     (2024.01)
    *B01J 37/02*     (2006.01)
    *B01J 37/08*     (2006.01)
    *C10L 5/14*     (2006.01)

(52) U.S. Cl.
CPC ....... *B01J 37/0205* (2013.01); *B01J 37/0219* (2013.01); *B01J 37/0236* (2013.01); *B01J 37/0242* (2013.01); *B01J 37/084* (2013.01); *B01J 37/088* (2013.01); *C10L 5/14* (2013.01); *C10L 2200/0209* (2013.01); *C10L 2200/0213* (2013.01); *C10L 2200/0469* (2013.01); *C10L 2250/04* (2013.01); *C10L 2290/08* (2013.01)

(58) Field of Classification Search
CPC .. B01J 37/0236; B01J 37/0242; B01J 37/084; B01J 37/088; B01J 23/72; B01J 37/08; B01J 37/32; C10L 5/14; C10L 2200/0209; C10L 2200/0213; C10L 2200/0469; C10L 2250/04; C10L 2290/08; C10L 2290/02; C10L 2290/141; C10L 5/406; C10L 9/086; C10L 1/04; C10L 1/02; C10L 2290/12
See application file for complete search history.

COPPER-MAGNESIUM CO-DOPED CARBONIZED WOOD SPONGE MATERIAL, PREPARATION THEREFOR, AND APPLICATION THEREOF, AND METHOD FOR CONVERTING PLASTICS INTO FUEL BASED ON FENTON-LIKE SYSTEM

CROSS-REFERENCE TO RELATED APPLICATIONS

This application claims priority of Chinese Patent Application No. 202310946155.3, filed on Jul. 28, 2023, the entire contents of which are incorporated herein by reference.

TECHNICAL FIELD

The present disclosure relates to the technical field of plastic waste treatment, and in particular to a copper-magnesium co-doped carbonized wood sponge material, a preparation therefor, and an application thereof, and a method for converting plastics into fuel based on a Fenton-like system.

BACKGROUND

As a cheap and disposable material, plastics are widely applied in packaging, construction, transportation, electronics and healthcare industries. However, due to mass production, single use, long lifespan, slow decomposition rate and damage to sensitive ecosystems, plastics have created a serious crisis of plastic pollution, and improper treatment of plastic waste can exacerbate environmental pollution. Accordingly, much attention has been paid to the catalytic conversion and upgrading of plastic waste into fuel and value-added chemicals on the basis of efficient conversion of waste plastics.

The fuel converted from plastic waste by conventional thermal treatment has a higher calorific value and performance close to that of gasoline and diesel fuel. However, the pyrolysis process of plastics is high in temperature, long in reaction time, low in yield, high in octane value and wide in carbon number distribution. In addition, pipes are easily clogged due to the formation of olefins and paraffins during the reaction, and volatile compounds produced during the pyrolysis can lead to environmental pollution. Advanced oxidation allows for the conversion of plastic waste into the targeted fuel under relatively mild conditions, with significantly reduced energy consumption compared to thermal treatment.

Sulfate radical-advanced oxidation processes (SR-AOPs) have been recognized as powerful methods for the elimination of organic pollutants by the generation of reactive species with high standard reduction potentials, such as sulfate radicals ($SO_4^{-}$, $E_0$=3.1 V vs normal hydrogen electrode (NHE)) and hydroxyl radicals (·OH, $E_0$=2.7 V vs NHE). A wide range of pollutants including dyes, antibiotics and persistent organic pollutants have been effectively degraded or mineralized by this technology due to its powerful oxidizing ability. Plastics, as a unique organic pollutant, have significantly higher molecular weights than the other low molecular weight organic pollutants mentioned above and are therefore more difficult to be degraded. Plastic conversion technologies based on SR-AOPs, especially the technology for the conversion of microplastics and plastic waste into environment-friendly and valuable products, have not been further studied and developed.

SUMMARY

An objective of the present disclosure is to provide a copper-magnesium co-doped carbonized wood sponge material, a preparation therefor, and an application thereof, and a method for converting plastics into fuel based on a Fenton-like system, enabling the directional conversion of plastic products into hydrocarbon and oxygen-containing fuel, and solving the technical problems of difficult conversion and utilization of plastic waste.

To realize the above objective, the present disclosure provides the following technical solutions.

The present disclosure provides a preparation method for a copper-magnesium co-doped carbonized wood sponge material, including the following steps:

compounding a wood raw material with a dopamine solution, and performing polymerization to obtain a wood material attached with polydopamine (PDA);

performing first impregnation of the wood material attached with PDA in a mixed metal salt solution, adding a 2-methylimidazole solution, performing second impregnation, and sequentially performing pre-freezing treatment and freeze-drying treatment of an obtained material to obtain a freeze-dried material, metal ions in the mixed metal salt solution including copper ions and magnesium ions; and performing calcination of the freeze-dried material to obtain a copper-magnesium co-doped carbonized wood sponge material.

Preferably, the dopamine solution is at a mass concentration of 25%, and the polymerization is performed for a period of 1.5 h.

Preferably, a molar ratio of the copper ions to the magnesium ions is (0.1-0.5):(0.1-0.5); and the first impregnation and the second impregnation independently include vacuum impregnation and atmospheric pressure impregnation sequentially performed.

Preferably, the pre-freezing treatment is performed at a temperature of −20° C. for a period of 8-12 h; and the freeze-drying treatment is performed at a temperature of −40° C. for a period of 24 h.

Preferably, the calcination is performed in a nitrogen atmosphere with a flow rate of nitrogen of 100-150 mL/min, at a temperature of 400-800° C. for a period of 120 min.

The present disclosure provides the copper-magnesium co-doped carbonized wood sponge material prepared by the preparation method described in the above technical solution.

The present disclosure provides an application of the copper-magnesium co-doped carbonized wood sponge material described in the above technical solution in the conversion of plastics into fuel.

The present disclosure provides a method for converting plastics into fuel based on a Fenton-like system, including the following steps:

mixing a plastic sample, a catalyst, persulfate and water, performing a hydrothermal reaction, and performing solid-liquid separation of an obtained product to obtain a plastic conversion product, the catalyst being the copper-magnesium co-doped carbonized wood sponge material described in the above technical solution provided by the present disclosure.

Preferably, the plastic sample includes polypropylene (PP); and a mass ratio of the plastic sample to the catalyst is (0.50-2):(0.15-0.50).

Preferably, the hydrothermal reaction is performed at a temperature of 80-160° C. for a period of 2-14 h.

In the present disclosure, a wood raw material coated with PDA is taken as a wood sponge substrate, and a copper-magnesium co-doped carbonized wood sponge catalyst is prepared by high-temperature pyrolysis after a copper element and a magnesium element are loaded on the wood sponge substrate; the catalyst realizes the loading of a porous metal oxide CuO/MgO nanoreactor on a wood sponge layered structure, and a unique spatial microenvironment and synergistic effect are formed by combining a superior three-dimensional lamellar structure of the wood sponge substrate with the structural advantages of the nanoreactor; and the catalyst has many active sites on the surface (metallic and non-metallic sites, the metallic sites being Cu/Mg oxides, and non-metallic sites being C—N, C—O/C=O and other related sites), which promote an electron transfer pathway on the surface, achieving the high efficiency activation of persulfate to generate reactive species with high standard reduction potentials such as hydroxyl radicals and sulphate radicals, thus enabling the targeted conversion of plastic products into hydrocarbon and oxygen-containing fuel, and solving the technical problems of difficult conversion and utilization of plastic waste.

In the present disclosure, a wood sponge is taken as a substrate to load with a nanoscale metal reactor, the prepared lump catalyst is easy to be recycled and reused, and the problem of difficult to recycle the conventional powder catalyst is solved.

The copper-magnesium co-doped carbonized wood sponge catalyst prepared by the present disclosure is used to activate the persulfate to convert PP into fuel, and after hydrothermal reaction with the persulfate at 160° C. for 14 h, a conversion rate of PP plastics (with an initial concentration of 1 g/L) is about 80%, and the relative content of chain hydrocarbon (with a number of carbon atoms of about 10-22) and oxygen-containing fuel (esters, alcohols, etc.) in products reaches more than 80%. The method of the present disclosure provides a new way for the targeted conversion of PP plastics into hydrocarbon and oxygen-containing fuel by a Fenton-like technology.

DETAILED DESCRIPTION

Figure 1A:
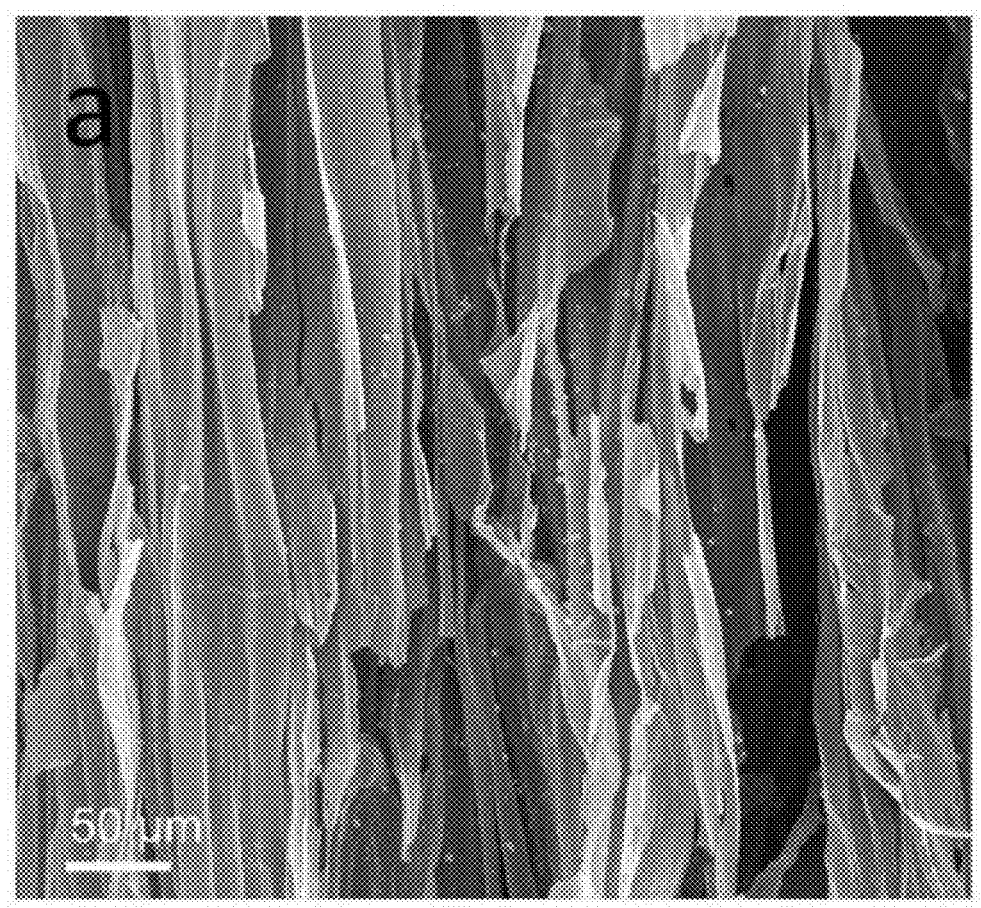
FIG. 1a shows a scanning electron microscope (SEM) image of a copper-magnesium co-doped carbonized wood sponge catalyst CuMgCWS600 prepared in Example 1.

The present disclosure provides a preparation method for a copper-magnesium co-doped carbonized wood sponge material, including the following steps.

A wood raw material is compounded with a dopamine solution, and polymerization is performed to obtain a wood material attached with PDA.

First impregnation of the wood material attached with PDA is performed in a mixed metal salt solution, a 2-methylimidazole solution is added for second impregnation, and pre-freezing treatment and freeze-drying treatment of an obtained material are sequentially performed to obtain a freeze-dried material, metal ions in the mixed metal salt solution including copper ions and magnesium ions.

The freeze-dried material is subjected to calcination to obtain a copper-magnesium co-doped carbonized wood sponge material.

In the present disclosure, unless otherwise specified, the raw materials required for preparation are commercially available commodities known to those skilled in the art.

In the present disclosure, the wood raw material is compounded with the dopamine solution, and the polymerization is performed to obtain the wood material attached with PDA.

In the present disclosure, the wood raw material is preferably made of wood. The present disclosure does not have a special limitation on the wood, *Ochroma lagopus* well known in the art is sufficient. In examples of the present disclosure, the wood is specifically balsa wood. In the present disclosure, preferably, the wood is cut into several small wooden blocks; after being dried, the wooden blocks are soaked in an acetic acid buffered sodium hypochlorite solution, and first oil bath treatment is performed (to remove lignin); after being cooled, the wooden blocks are taken out, and washed with deionized water and ethyl ethanol for several times until a solution is neutral; the washed wooden blocks are soaked in a sodium hydroxide solution, and second oil bath treatment is performed (to remove hemicellulose); and the wooden blocks are washed with deionized water and ethyl ethanol until an eluate is neutral to obtain the wood raw material, which is stored in cold deionized water. The present disclosure has no special limitation on the size of the small wooden blocks, which can be adjusted according to actual needs.

In the present disclosure, the acetic acid buffered sodium hypochlorite solution is preferably at a concentration of 2.5 wt %, with a pH of 4.5; the sodium hydroxide solution is preferably at a concentration of 9 wt %; the first oil bath treatment is preferably performed at a temperature of 80-90° C. for a period of 8-10 h; and the second oil bath treatment is preferably performed at a temperature of 90-100° C. for a period of 6-8 h.

In the present disclosure, the wood raw material after being obtained is washed with the deionized water and the ethyl ethanol separately until the eluent is neutral, and then is compounded with the dopamine solution.

In the present disclosure, a solvent used for the dopamine solution is preferably a tris-hydroxymethylaminomethane-hydrochloric acid (Tris-HCl) buffer solution; and the Tris buffer solution is preferably at a concentration of 8 mmol/L, HCl used is preferably at a concentration of 0.15 mol/L, and the Tris-HCl solution is preferably at a pH of 8.4.

In the present disclosure, the dopamine solution is preferably at a mass concentration of 25%; and the polymerization is preferably performed for a period of 1.5 h under an oscillatory condition.

The present disclosure does not specifically limit the manner in which the wood raw material is compounded with the dopamine solution, and it is sufficient to fully impregnate the wood raw material into the dopamine solution in accordance with a process well known in the art.

The present disclosure does not specifically limit the amount of the dopamine solution, and it is sufficient to completely impregnate the wood raw material.

In the present disclosure, by polymerization of dopamine, a surface of the wood raw material is coated with PDA, and with the help of the weak oxidation-reduction of the phenolic hydroxyl group in the PDA molecule and the complexing ability of nitrogen-containing group to metal ions, metals copper and magnesium are better deposited on the surface of the substrate, and nitrogen sites are introduced at the same time.

In the present disclosure, the wood material attached with PDA after being obtained is subjected to the first impregnation in the mixed metal salt solution, the 2-methylimidazole solution is added for the second impregnation, and the pre-freezing treatment and the freeze-drying treatment of the obtained material are sequentially performed to obtain the freeze-dried material.

In the present disclosure, preferably, the wood material attached with PDA after being washed at least four times sequentially with deionized water and ethyl ethanol is subjected to the first impregnation in the mixed metal salt solution.

In the present disclosure, the metal ions in the mixed metal salt solution include the copper ions and the magnesium ions; a copper salt used is preferably copper nitrate trihydrate; a magnesium salt used is preferably magnesium chloride; a molar ratio of the copper ions to the magnesium ions is preferably (0.1-0.5):(0.1-0.5), more preferably 0.1: 0.1; a solvent used for the mixed metal salt solution is preferably methanol; and the copper ions and the magnesium ions in the mixed metal salt solution are independently preferably at a concentration of 0.1-0.5 mol/L, more preferably at 0.2-0.3 mol/L. In the present disclosure, preferably, a methanol solution of copper salt and a methanol solution of magnesium salt are ultrasonically mixed for 10 min to obtain the mixed metal salt solution.

In the present disclosure, the first impregnation includes vacuum impregnation and atmospheric pressure impregnation sequentially performed; the vacuum impregnation and the atmospheric pressure impregnation are preferably performed for a period of 30 min; and the vacuum impregnation is preferably performed at a pressure of 0.01 MPa.

In the present disclosure, after the completion of the first impregnation, the 2-methylimidazole solution is added to perform the second impregnation.

In the present disclosure, a solvent used for the 2-methylimidazole solution is preferably methanol; the 2-methylimidazole solution is preferably at a concentration of 0.4 mol/L; and the 2-methylimidazole solution is preferably at a volume the same as that of the mixed metal salt solution. In the present disclosure, 2-methylimidazole is used as an organic ligand to form coordination bonds with copper and magnesium metal ions, contributing to the formation of a metal-organic framework as a precursor for a porous metal oxide CuO/MgO nanoreactor.

In the present disclosure, the second impregnation preferably includes vacuum impregnation and atmospheric pressure impregnation sequentially performed; the vacuum impregnation and the atmospheric pressure impregnation are preferably performed for a period of 30 min; and the vacuum impregnation is preferably performed at a pressure of 0.01 MPa.

In the present disclosure, after the completion of the second impregnation, the obtained mixture is preferably oscillated at 100-150 rpm (more preferably at 120 rpm) at a constant temperature of 20-40° C. (more preferably at 30° C.) for 8-12 h (more preferably for 10 h) (to ensure sufficient binding of the metal with the organic ligand 2-methylimidazole), the material is taken out and washed with deionized water and ethyl ethanol until an eluate is neutral, and pre-freezing treatment is performed.

In the present disclosure, the pre-freezing treatment is preferably performed at a temperature of −20° C. for a period of 8-12 h; and the freeze-drying treatment is preferably performed at a temperature of −40° C. for a period of 24 h.

In the present disclosure, the freeze-dried material after being obtained is subjected to calcination to obtain the copper-magnesium co-doped carbonized wood sponge material.

In the present disclosure, the calcination is preferably performed in a nitrogen atmosphere, and the calcination is preferably performed in a tube furnace, which is preferably aerated with nitrogen for a continuous period of 20 min prior to the start-up of the tube furnace, to exhaust the air from the tube furnace and from an air channel, and a flow rate of the nitrogen is adjusted and a temperature is raised to the temperature for the calcination.

In the present disclosure, the nitrogen is preferably at a flow rate of 100-150 mL/min, more preferably at 120-130 mL/min, and the calcination is preferably performed at a temperature of 400-800° C. for a period of 120 min, more preferably at a temperature of 600° C.; and a temperature rise rate for raising to the temperature for the calcination is preferably at 5° C./min.

In the present disclosure, after the completion of the calcination, the obtained product is preferably cooled to room temperature to obtain the copper-magnesium co-doped carbonized wood sponge material.

The present disclosure provides the copper-magnesium co-doped carbonized wood sponge material prepared by the preparation method described in the above technical solution.

The present disclosure provides an application of the copper-magnesium co-doped carbonized wood sponge material described in the above technical solution in the conversion of plastics into fuel.

The present disclosure provides a method for converting plastics into fuel based on a Fenton-like system, including the following steps.

A plastic sample, a catalyst, persulfate and water are mixed for a hydrothermal reaction, and solid-liquid separation of an obtained product is performed to obtain a plastic conversion product, the catalyst being the copper-magnesium co-doped carbonized wood sponge material described in the above technical solution provided by the present disclosure.

In the present disclosure, the plastic sample preferably includes PP; and a mass ratio of the plastic sample to the catalyst is preferably (0.50-2):(0.15-0.50), more preferably 1:0.17.

In the present disclosure, the plastic sample in the water is preferably at a concentration of 0.50-2 g/L, more preferably at 1 g/L, and the catalyst in the water is preferably at a concentration of 0.15-0.50 g/L, more preferably at 0.17-0.33 g/L; and the persulfate in the water is preferably at a concentration of 6.5-58.5 mmol/L, more preferably at 19.5 mmol/L, and the persulfate is preferably peroxymonosulfate or persulfacte, the peroxymonosulfate being preferably $KHSO_5$ (potassium persulfate (PMS)) or $NaHSO_5$, and the persulfacte being preferably $Na_2S_2O_8$ or $K_2S_2O_8$.

In the present disclosure, the hydrothermal reaction is preferably performed at a temperature of 80-160° C., more preferably at 100-140° C., for a period of 2-14 h, more preferably for 4-12 h, and further preferably for 8-10 h.

In the process of the hydrothermal reaction, under the combined action of the catalyst and high temperature, PMS is activated to produce strong oxidizing hydroxyl radicals (·OH), a small amount of sulfate radicals ($SO_4^-$), singlet oxygen ($^1O_2$) and other reactive substances, thus realizing the high efficiency conversion of the plastic sample.

In the present disclosure, after the completion of the hydrothermal reaction, the obtained product is preferably cooled for 2-4 h (more preferably for 3.5 h), and a sample of 5-10 mL is taken with a syringe and is filtered through a 0.22 μm organic microporous filter head, followed by performing cold storage; and the remaining solution is subjected to suction filtration by a 0.22 μm organic filter membrane to separate a solid-liquid phase, and an obtained solid is weighted for mass after being dried at 60-70° C. for 18-24 h, and a conversion rate of PP is calculated.

In the present disclosure, 1 mL of the sample by cold storage is taken, and the same dose of dichloromethane is taken as a solvent to extract a liquid product from the sample; shaking is performed at least three times, obvious delamination can be observed, a solution underneath is sucked with a syringe, and the types of plastic conversion products in the solution are determined by gas chromatography-mass spectrometry (GC-MS).

The technical solutions provided by the present disclosure are described in detail below combined with the examples, but the examples are not to be construed as limiting the scope of protection of the present disclosure.

Example 1

Balsa wood was cut into 5×5×5 mm³ small wooden blocks, and an acetic acid buffered $NaClO_2$ solution (a mass fraction of 2.5 wt %) with a pH of 4.5 was prepared. The small wooden blocks were immersed into the acetic acid buffered $NaClO_2$ solution and heating was performed in an oil bath, and a reaction temperature was adjusted to 90° C., which was maintained for 10 h. After being cooled, the wooden blocks were taken out, and washed with deionized water and ethyl ethanol for several times until a solution was neutral. The washed wooden blocks were soaked with an NaOH solution with a mass fraction of 9 wt %, and a reaction temperature was adjusted to 90° C., which was maintained for 6 h. The wooden blocks were washed with deionized water and ethyl ethanol until an eluate was neutral, and an obtained wood sponge substrate was stored in cold deionized water.

A pH of a Tris buffer solution (8 mmol/L) was adjusted to 8.4 with 0.15 mol/L of HCl, and dopamine was dissolved in the Tris buffer solution to obtain a dopamine solution with a mass fraction of 0.25 wt %. Wooden block samples taken out of the cold water were quickly placed in the dopamine solution, followed by continuously oscillating for 1.5 h to obtain PDA-coated wooden blocks.

A methanol solution of 0.1 mol/L $Cu(NO_3)_2 \cdot 3H_2O$ and a methanol solution of 0.1 mol/L $MgCl_2$ were mixed for sonicating for 10 min. The PDA-coated wooden blocks were submerged in the mixed solution, and impregnated at 0.01 MPa for 30 min and then impregnated at an atmospheric pressure for 30 min. A 2-methylimidazole solution dissolved in 0.4 mol/L methanol was poured into the mixed solution. Impregnation was performed at 0.01 MPa for 30 min and standing was performed at an atmospheric pressure for 30 min, and the obtained mixed solution was oscillated at 120 rpm at a constant temperature of 30° C. for 10 h. The wooden blocks were taken out and washed until an effluent was neutral. The wooden blocks stored in the cold water were taken out, and transferred to a freeze dryer for freeze-drying at −40° C. for 24 h after being pre-frozen at −20° C. for 8 h. Copper-magnesium doped wood sponge samples were obtained after the wooden blocks were taken out.

The copper-magnesium doped wood sponge samples were placed in quartz boats, and then transferred to tube furnaces. A flow rate of nitrogen was controlled to be 150 mL/min for 20 min, and then the flow rate of the nitrogen was adjusted to be 100 mL/min. The tube furnaces were separately heated to 400° C., 600° C. and 800° C. with a heating rate of 5° C./min for 120 min. After the tube furnaces were naturally cooled to room temperature, carbonized wood sponge-based catalysts were taken out and sealed in dry bottles for storage. Copper-magnesium co-doped carbonized wood sponge catalysts prepared at 400° C., 600° C. and 800° C. were named CuMgCWS400, CuMgCWS600 and CuMgCWS800, respectively.

Characterization

Figure 1B:
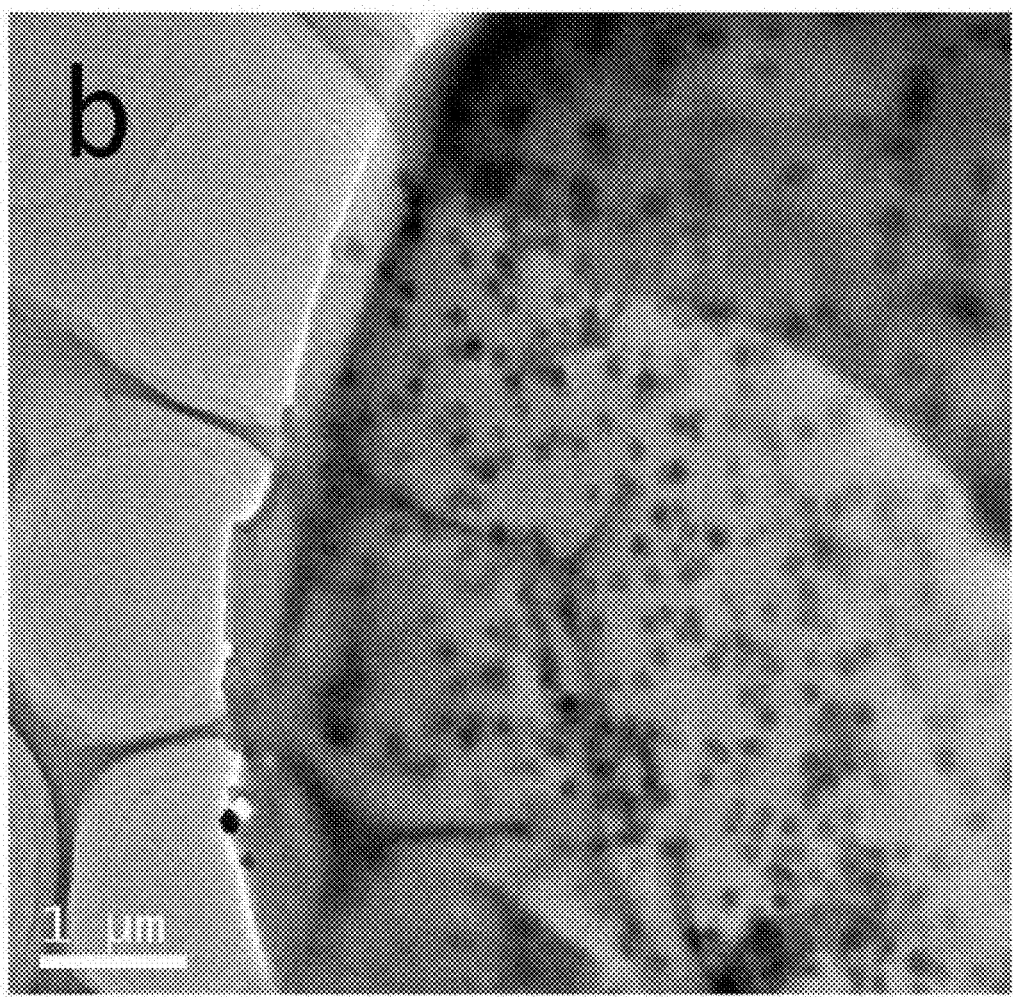
FIG. 1b shows a transmission electron microscope (TEM) image of the copper-magnesium co-doped carbonized wood sponge catalyst CuMgCWS600 prepared in Example 1 at the 1 μm scale.
Figure 1C:
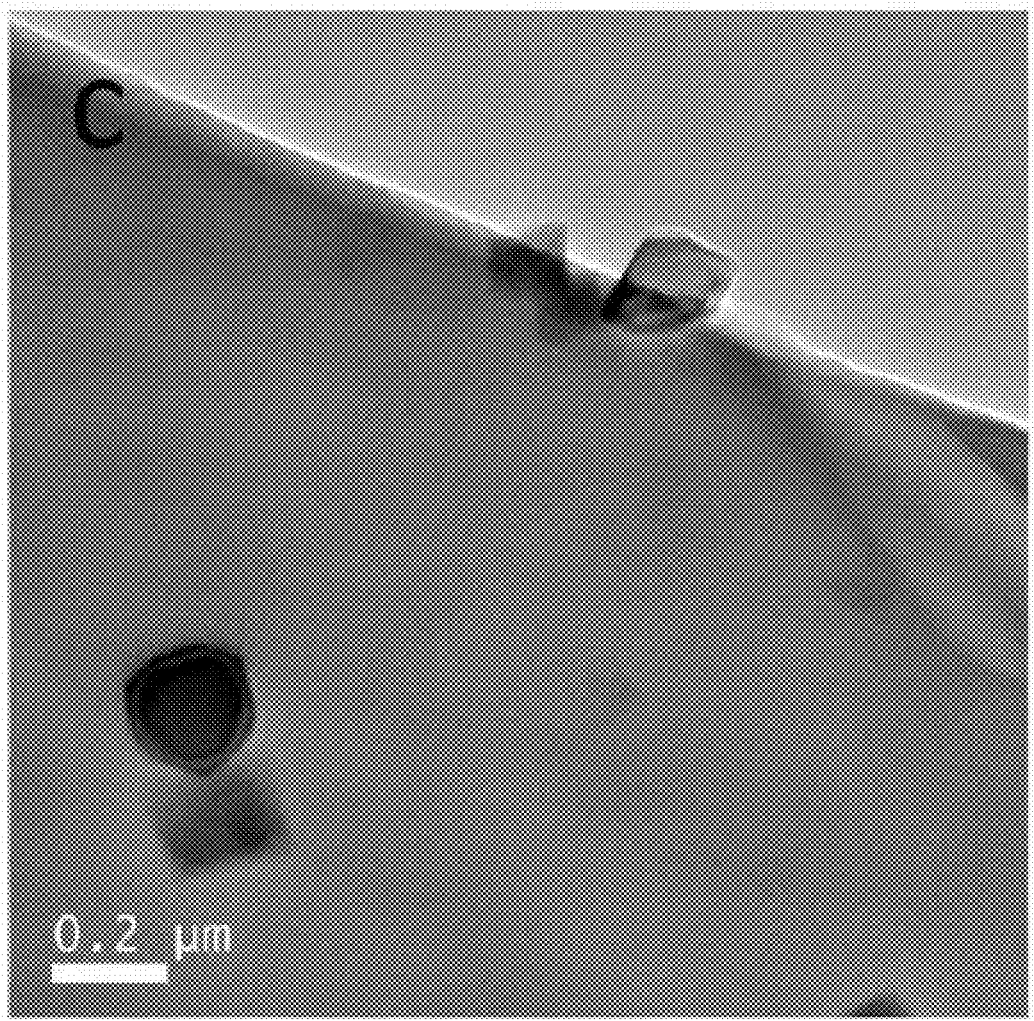
FIG. 1c shows a TEM image of the CuMgCWS600 prepared in Example 1 at the 0.2 μm scale.

FIGS. 1a-1c show an SEM image (a) and TEM images (b and c) at different magnification times of a copper-magnesium co-doped carbonized wood sponge catalyst CuMgCWS600 prepared in Example 1. From FIGS. 1a-1b, it can be observed that wood sponges still maintain three-dimensional layered and porous structures after carbonization, and at the same time, metal nanostructures well loaded on lamellar structures can be observed. FIG. 1c shows a microstructure of the loaded metal nanoreactor, and irregular polyhedral structures derived from a metal-organic framework can be observed.

Application Example 1

30 mL of deionized water was taken as a solvent. 1 g/L of PP and 0.17 g/L of the catalyst sample prepared in Example 1 were placed in a hydrothermal reactor. PMS was added to make a concentration to be 6.5 mM. The reactor was taken out after 14 h of hydrothermal reaction at 140° C., and was cooled for 3.5 h. 5 mL of a sample was taken and was subjected to cold storage after being filtered through a 0.22 μm organic microporous filter head. The remaining solution was subjected to suction filtration to separate a solid-liquid phase, and a solid obtained was weighted for mass after being dried at 60° C. for 24 h, and a conversion rate of PP was calculated.

1 mL of the sample by cold storage was taken, and the same dose of dichloromethane was taken as a solvent to extract a liquid product from the sample. Shaking was performed at least three times, obvious delamination could be observed, a solution underneath was sucked with a syringe, and the types of plastic conversion products in the solution were determined by GC-MS.

Under the synergistic effect of Cu and Mg metal sites on the catalyst surface and high-temperature thermal activation, a broken bond of PMS mainly generates strong oxidizing hydroxyl radicals (·OH), a small amount of sulfate radicals ($SO_4^-$), singlet oxygen ($^1O_2$) and other reactive substances, which attack the polymer and introduces oxygen atoms, generating small molecular chain hydrocarbon and oxygen-containing substances as fuel.

Application Example 2

30 mL of deionized water was taken as a solvent. 1 g/L of PP and 0.33 g/L of the CuMgCWS600 catalyst sample prepared in Example 1 were placed in a hydrothermal reactor. PMS was added to make a concentration to be 19.5 mM. The reactor was taken out after hydrothermal reaction at 160° C. for 2 h, 4 h, 8 h, 10 h, 12 h and 14 h, and was cooled for 4 h. 5 mL of a sample was taken and was subjected to cold storage after being filtered through a 0.22 μm organic microporous filter head. The remaining solution was subjected to suction filtration to separate a solid-liquid phase, and a solid obtained was weighted for mass after being dried at 60° C. for 24 h, and a conversion rate of PP was calculated.

1 mL of the sample by cold storage was taken, and the same dose of dichloromethane was taken as a solvent to extract a liquid product from the sample. Shaking was performed at least three times, obvious delamination could be observed, a solution underneath was sucked with a syringe, and the types of plastic conversion products in the solution were determined by GC-MS.

Figure 2:
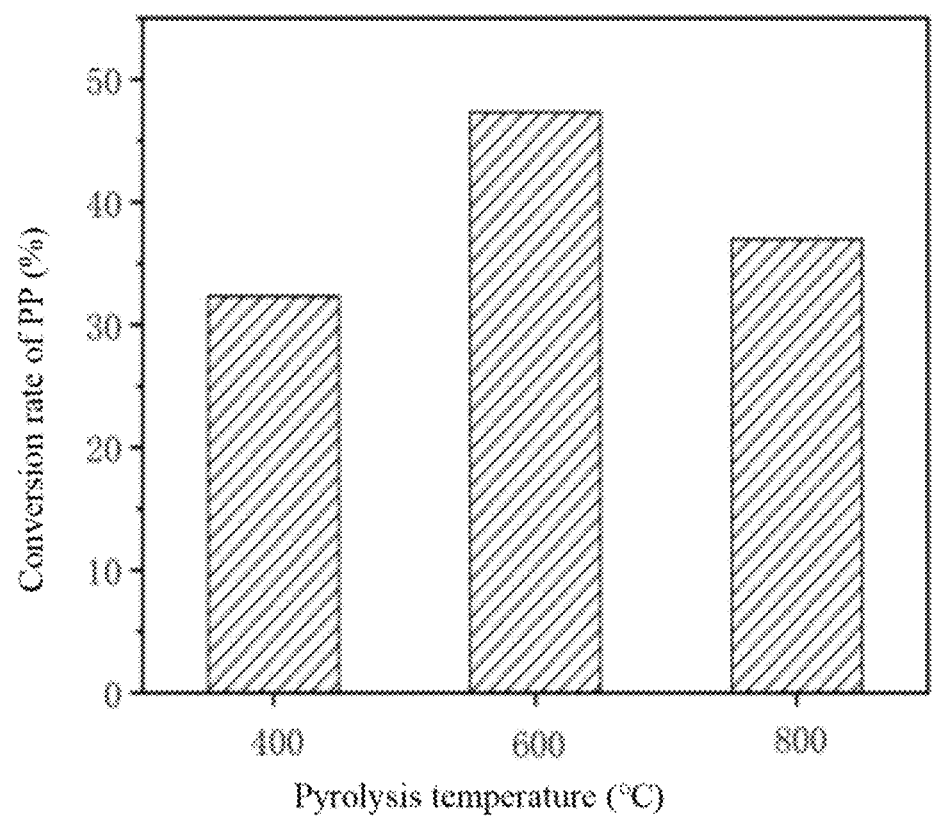
FIG. 2 shows the effect of catalysts prepared at different pyrolysis temperatures on the conversion of PP in Example 1.

FIG. 2 shows the effect of catalysts prepared at different pyrolysis temperatures on the conversion of PP in Example 1. As can be seen from FIG. 2, CuMgCWS600 has the highest conversion rate of PP compared to CuMgCWS400 and CuMgCWS800.

Figure 3:
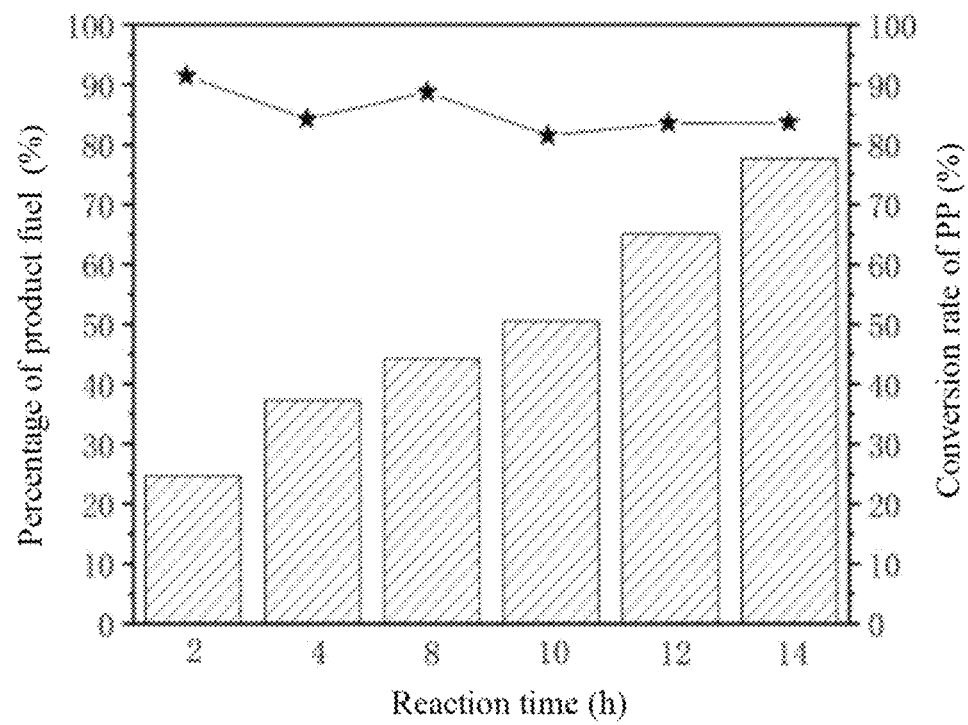
FIG. 3 shows the conversion effect and product distribution of PP by a catalyst at different reaction times in Application Example 2.

FIG. 3 shows the conversion effect and product distribution of PP by a catalyst at different reaction times in Application Example 2. As can be seen from FIG. 3, the PP conversion effect increases in a gradient with the extension of reaction time, and the percentages of hydrocarbon and oxygen-containing fuel in the products are maintained at 80% or more.

Figure 4:
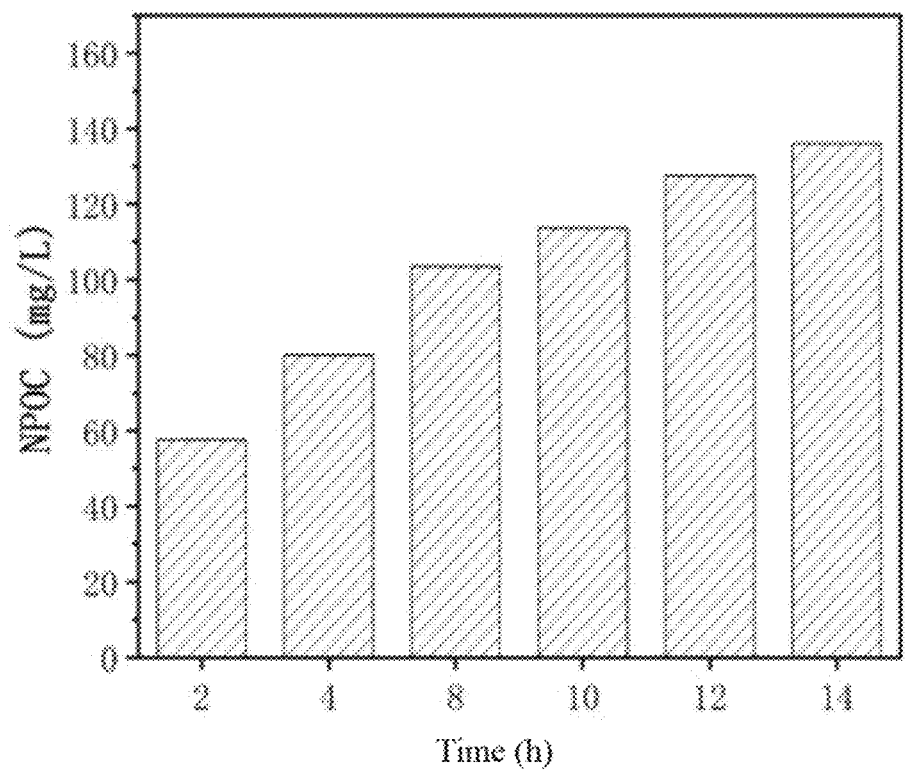
FIG. 4 shows the variation of the content of a catalytic product non-purge organic carbon (NPOC) at different reaction times in Application Example 2.

FIG. 4 shows the variation of the content of an NPOC at different reaction times in Application Example 2. FIG. 4 illustrates that the conversion of PP by a CuMgCWS600/PMS system can produce valuable organic matter rather than simply mineralizing PP to carbon dioxide and water.

Figure 5:
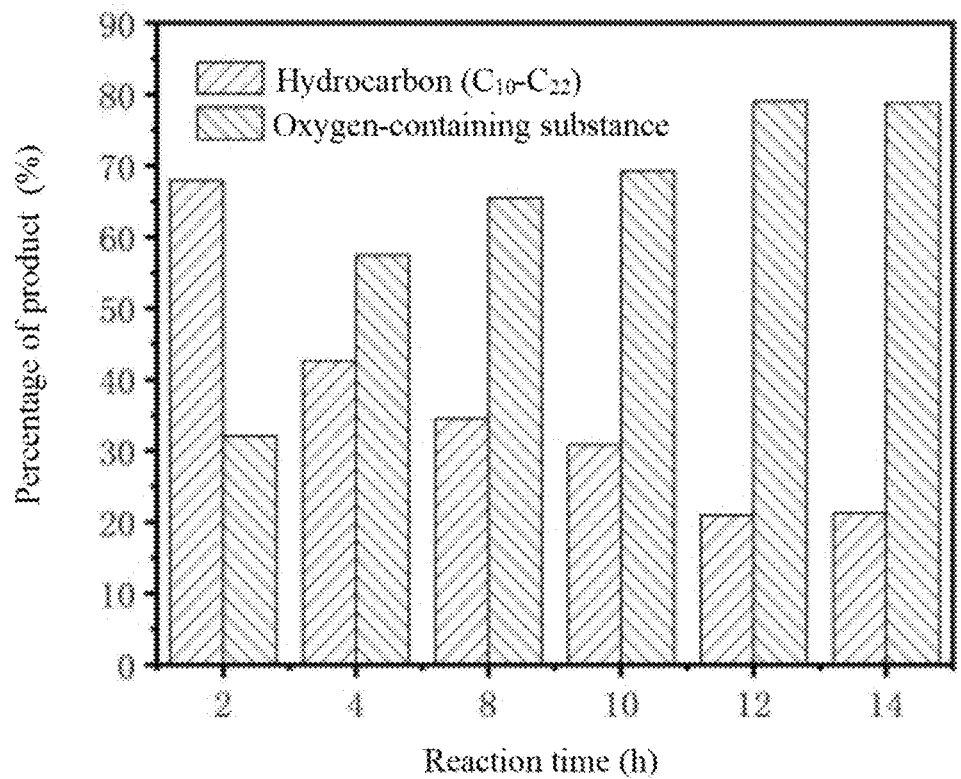
FIG. 5 shows the types and percentages of PP conversion products at different reaction times.

FIG. 5 shows the types and percentages of PP conversion products at different reaction times. As can be seen from FIG. 5, the product includes small molecular chain hydrocarbon with the number of carbon atoms concentrated in the range of 10-22 and oxygen-containing substances; and under the action of the dominant active substance in the system, PP is converted from a macromolecular polymer into small molecular chain hydrocarbon and oxygen-containing products, and with the extension of the reaction time, the degree of oxidation of the product is increased, the relative content of the chain hydrocarbon is decreased, and the relative content of the oxygen-containing substances is increased.

The foregoing is only preferred examples of the present disclosure, and it is to be noted that a person of ordinary skill in the art may make several improvements and embellishments without departing from the principles of the present disclosure, and these improvements and embellishments are considered to be within the scope of protection of the present disclosure.

What is claimed is:

1. A method for converting plastics into fuel based on a Fenton-like system, comprising the following steps:
mixing a plastic sample, a catalyst, persulfate and water, performing a hydrothermal reaction, and performing solid-liquid separation of an obtained product to obtain a plastic conversion product,
the catalyst being a copper-magnesium co-doped carbonized wood sponge material, and
a preparation method for the copper-magnesium co-doped carbonized wood sponge material comprising the following steps:
compounding a wood raw material with a dopamine solution, and performing polymerization to obtain a wood material attached with polydopamine (PDA),
performing first impregnation of the wood material attached with PDA in a mixed metal salt solution, adding a 2-methylimidazole solution, performing second impregnation, and sequentially performing pre-freezing and freeze-drying of an obtained material to obtain a freeze-dried material, metal ions in the mixed metal salt solution comprising copper ions and magnesium ions, and
performing calcination of the freeze-dried material to obtain the copper-magnesium co-doped carbonized wood sponge material.

2. The method according to claim 1, wherein the dopamine solution is at a mass concentration of 0.25%, and the polymerization is performed for a period of 1.5 h.

3. The method according to claim 1, wherein a molar ratio of the copper ions to the magnesium ions is (0.1-0.5):(0.1-0.5); and the first impregnation and the second impregnation independently comprise vacuum impregnation and atmospheric pressure impregnation sequentially performed.

4. The method according to claim 1, wherein the pre-freezing is performed at a temperature of −20° C. for a period of 8-12 h; and the freeze-drying is performed at a temperature of −40° C. for a period of 24 h.

5. The method according to claim 1, wherein the calcination is performed in a nitrogen atmosphere with a flow rate of nitrogen of 100-150 mL/min, at a temperature of 400-800° C. for a period of 120 min.

6. The method according to claim 1, wherein the plastic sample comprises polypropylene (PP); and a mass ratio of the plastic sample to the catalyst is (0.50-2):(0.15-0.50).

7. The method according to claim 1, wherein the hydrothermal reaction is performed at a temperature of 80-160° C. for a period of 2-14 h.

* * * * *